United States Patent
Zhang et al.

(10) Patent No.: US 9,648,503 B2
(45) Date of Patent: May 9, 2017

(54) SYSTEM AND METHOD TO ESTABLISH AND MAINTAIN CELL CLUSTERS (71) Applicant: AVAGO TECHNOLOGIES GENERAL IP (SINGAPORE) PTE. LTD., Singapore (SG)

(72) Inventors: Lili Zhang, Beijing (CN); Chunyan Gao, Beijing (CN); Jing Han, Beijing (CN); Wei Hong, Beijing (CN); Haiming Wang, Beijing (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 97 days.

(21) Appl. No.: 14/758,868

(22) PCT Filed: Jan. 9, 2013

(86) PCT No.: PCT/CN2013/070271
§ 371 (c)(1),
(2) Date: Jul. 1, 2015

(87) PCT Pub. No.: WO2014/107849
PCT Pub. Date: Jul. 17, 2014

(65) Prior Publication Data
US 2015/0341799 A1    Nov. 26, 2015

(51) Int. Cl.
*H04W 4/00* (2009.01)
*H04W 16/24* (2009.01)
(Continued)

(52) U.S. Cl.
CPC ............ *H04W 16/24* (2013.01); *H04L 5/14* (2013.01); *H04W 16/32* (2013.01); *H04W 24/08* (2013.01);
(Continued)

(58) Field of Classification Search
CPC ..... H04W 84/18; H04W 4/02; H04W 76/023; H04W 4/023; H04W 8/005; H04W 48/16
See application file for complete search history.

(56) References Cited

U.S. PATENT DOCUMENTS

| 6,980,537 B1 | 12/2005 | Liu | |
|---|---|---|---|
| 2007/0091889 A1* | 4/2007 | Xiao | H04L 1/1854 370/390 |

(Continued)

FOREIGN PATENT DOCUMENTS

CN    102487510    6/2012

OTHER PUBLICATIONS

International Search Report issued Oct. 17, 2013, in PCT/CN2013/070271 filed Jan. 9, 2013.

*Primary Examiner* — Chi H Pham
*Assistant Examiner* — Sai Aung
(74) *Attorney, Agent, or Firm* — Oblon, McClelland, Maier & Neustadt, L.L.P.

(57) ABSTRACT

A wireless communication method of establishing and maintaining a cell cluster comprising at least one cell configured to communicate with at least one UE (User Equipment), comprising detecting a broadcast beacon signal. The method further comprises, in response to an absence of the broadcast beacon signal, assuming the role of a cluster head of a cluster having a specific intra-cell identifier, and broadcasting a beacon signal. In response to detecting the broadcast beacon signal and an absence of an intra-cell identifier, continuing to transmit and receive using a prior duplex communication configuration. Further, in response to detecting the broadcast beacon signal and a presence of the intra-cell identifier, joining the cell identified by the detected intra-cell identifier, and setting its intra-cell identifier based on the detected intra-cell identifier.

20 Claims, 5 Drawing Sheets (51) Int. Cl.
*H04W 72/04* (2009.01)
*H04L 5/14* (2006.01)
*H04W 24/08* (2009.01)
*H04W 16/32* (2009.01)
*H04W 88/02* (2009.01)
*H04L 5/00* (2006.01)

(52) U.S. Cl.
CPC ....... *H04W 72/0413* (2013.01); *H04L 5/0073* (2013.01); *H04L 5/1469* (2013.01); *H04W 88/02* (2013.01)

(56) References Cited

U.S. PATENT DOCUMENTS

| | | | |
|---|---|---|---|
| 2008/0261639 A1* | 10/2008 | Sun | H04W 16/14 455/515 |
| 2010/0120447 A1* | 5/2010 | Anderson | H04W 64/003 455/456.1 |
| 2010/0246405 A1 | 9/2010 | Potkonjak | |
| 2010/0246438 A1 | 9/2010 | Potkonjak | |
| 2010/0246485 A1 | 9/2010 | Potkonjak | |
| 2011/0044193 A1* | 2/2011 | Forenza | H04B 7/024 370/252 |
| 2012/0026941 A1* | 2/2012 | Ahmad | H04W 48/16 370/328 |
| 2012/0322484 A1* | 12/2012 | Yu | H04W 4/08 455/509 |
| 2013/0122916 A1 | 5/2013 | Potkonjak | |
| 2013/0128772 A1 | 5/2013 | Potkonjak | |
| 2013/0130701 A1 | 5/2013 | Potkonjak | |
| 2013/0137457 A1 | 5/2013 | Potkonjak | |

\* cited by examiner

SYSTEM AND METHOD TO ESTABLISH AND MAINTAIN CELL CLUSTERS

FIELD

The present disclosure relates the field of wireless communications, and more particularly to a system and method to establish and maintain cell clusters.

BACKGROUND

The Third Generation Partnership Project (3GPP) unites six telecommunications standards bodies, known as "Organizational Partners," and provides their members with a stable environment to produce the highly successful Reports and Specifications that define 3GPP technologies. A mobile device, also called a User Equipment (UE), may operate in a wireless communication network that provides high-speed data and/or voice communications. The wireless communication networks may implement circuit-switched (CS) and/or packet-switched (PS) communication protocols to provide various services. For example, the UE may operate in accordance with one or more of an Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA: includes Wideband-CDMA (W-CDMA) and Low Chip Rate (LCR) cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

LTE (Long Term Evolution) is a new standard for wireless communication of high-speed data for mobile phones and data terminals. It is based on the GSM/EDGE and UMTS/HSPA (Universal Mobile Telecommunication System/High Speed Packet Access) network technologies, increasing the capacity and speed using new modulation techniques. The IP-based LTE network architecture, called the Evolved Packet Core (EPC) supports seamless handovers for both voice and data to cell towers with older network technology such as GSM, UMTS and CDMA2000. The LTE technology is adapted for a smooth evolution from earlier 3GPP systems. In LTE networking, technologies such as inter-cell interference coordination (ICIC) in the frequency domain and enhanced ICIC (eICIC) in the time domain have been developed for a new heterogeneous network topology in LTE-Advanced technology.

Heterogeneous networks arose due to the rapidly increasing numbers of mobile subscribers and demand for bandwidth, and the inadequacy of traditional macro base stations to meet subscriber requirements. Homogenous networks consisting of solely traditional macro base stations may have blind spots in coverage that adversely impact user experience. With the introduction of lower power base stations, including pico cells, femto cells, and relay nodes, LTE network topology becomes a heterogeneous network (HetNet) that is able to deliver more complete coverage. In a HetNet defined in 3GPP Release 10, low power nodes (LPNs), such as RRU/RRH, pico eNB (Enhanced Node B), home eNB, and relay node, are deployed inside the macro base station or eNB coverage cell.

The concept of cell clustering has been proposed as a method for interference mitigation (Cell Clustering Interference Mitigation or CCIM) for LTE Time Division Duplex (TDD) in which asymmetric uplink (UL) and downlink (DL) resources are allocated. In a local area network, due to the small number of active UEs per cell, the traffic situation may fluctuate frequently, and TDD reconfiguration to adapt to traffic conditions is expected to provide improved resource efficiency and provide power savings. In the current LTE deployment, the same TDD configuration in each cell is assumed, since otherwise interference between UL and DL including both base station-to-base station and User Equipment-to-User Equipment (UE-to-UE) interference needs to be considered.

In CCIM, cells are divided into cell clusters according to some metric(s), such as coupling loss, interference level, etc. between cells. A cell cluster can comprise one or more cells. The active transmissions of all cells in each cell cluster are either uplink or downlink in any subframe or a subset of all subframes, so that eNB-to-eNB interference and UE-to-UE interference can be mitigated within the cell cluster. Hence, coordination between the multiple cells belonging to the same cell cluster is needed. Transmission directions in cells belonging to different cell clusters can be different in a subframe by selecting the different TDD configurations freely, in order to achieve the benefits of TDD UL-DL reconfiguration based on traffic adaptation. However, how cell clusters may be formed, and managed or maintained have heretofore not been proposed nor implemented.

SUMMARY

A wireless communication method of establishing and maintaining a cell cluster comprising at least one cell configured to communicate with at least one UE (User Equipment), comprising detecting a broadcast beacon signal. The method further comprises, in response to an absence of the broadcast beacon signal, assuming the role of a cluster head of a cluster having a specific intra-cell identifier, and broadcasting a beacon signal. In response to detecting the broadcast beacon signal and an absence of an intra-cell identifier, continuing to transmit and receive using a prior duplex communication configuration. Further, in response to detecting the broadcast beacon signal and a presence of the intra-cell identifier, joining the cell identified by the detected intra-cell identifier, and setting its intra-cell identifier based on the detected intra-cell identifier.

A wireless communication network node, comprising an antenna, at least one radio transmitter and receiver, and at least one processor providing resource management and logical control functions, configured to: detect a broadcast beacon signal, in response of an absence of the broadcast beacon signal, assume the role of a cluster head of a cluster having a specific intra-cell identifier, and broadcast a beacon signal, in response to detecting the broadcast beacon signal and an absence of an intra-cell identifier, continue to transmit and receive using a prior duplex communication configuration, and in response to detecting the broadcast beacon signal and a presence of the intra-cell identifier, join the cell identified by the detected intra-cell identifier, and set its intra-cell identifier based on the detected intra-cell identifier.

A computer-readable medium comprising a set of instructions, which, when executed on a communication network node causes it to perform the steps of: detecting a broadcast beacon signal, in response of an absence of the broadcast beacon signal, assuming the role of a cluster head of a cluster having a specific intra-cell identifier, and broadcasting a beacon signal, in response to detecting the broadcast beacon signal and an absence of an intra-cell identifier, continuing to transmit and receive using a prior duplex communication configuration, and in response to detecting the broadcast beacon signal and a presence of the intra-cell identifier, joining the cell identified by the detected intra-cell identifier, and setting its intra-cell identifier based on the detected intra-cell identifier.

An eNB cell in a local area network comprising means for detecting a broadcast beacon signal, in response of an absence of the broadcast beacon signal, means for assuming the role of a cluster head of a cluster having a specific intra-cell identifier, and broadcasting a beacon signal, in response to detecting the broadcast beacon signal and an absence of an intra-cell identifier, means for continuing to transmit and receive using a prior duplex communication configuration, and in response to detecting the broadcast beacon signal and a presence of the intra-cell identifier, means for joining the cell identified by the detected intra-cell identifier, and setting its intra-cell identifier based on the detected intra-cell identifier.

DETAILED DESCRIPTION

Figure 1:
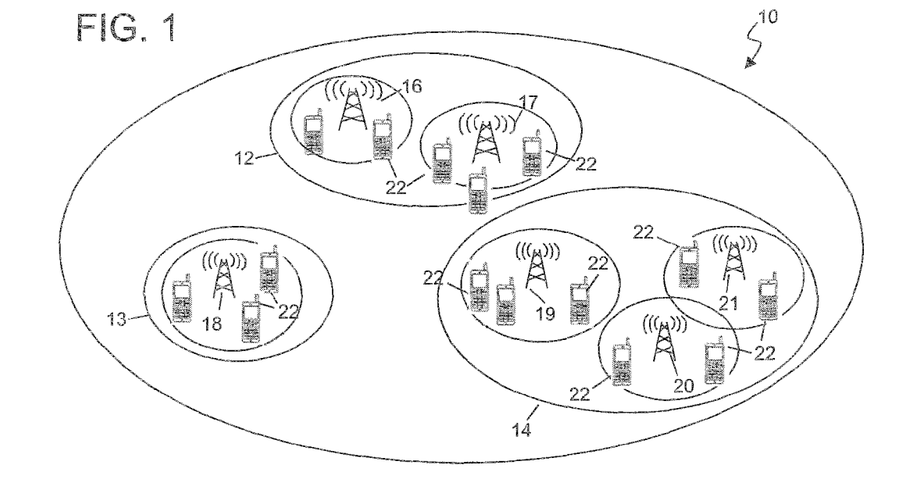
FIG. 1 is a simplified diagram of an exemplary wireless communication network 10 comprising three isolated cell clusters.

FIG. 1 is a simplified diagram of an exemplary wireless communication network 10 comprising three isolated cell clusters 12-14, where each cell cluster comprises one or more base stations such as an Enhanced Node B (eNB) 16-21 servicing a plurality of User Equipment (UEs) 22. The eNB 16-21 typically include antenna, radio transmitter, radio receiver, and processors that provide resource management and logical control functions. The term User Equipment or UE is used herein to refer to any mobile device configured to operate and communicate in a wireless environment, and may encompass a wide variety of devices including and not limited to wireless transmit/receiver units, cellular telephones, tablets, smartphones, computers, network nodes, etc.

The concept of cell clustering has been proposed as a method for interference mitigation (IM) for LTE Time Division Duplex (TDD) in which asymmetric uplink (UL) and downlink (DL) resources are allocated. Each cell cluster comprises one or more cells or eNBs. In CCIM, these cells are divided into cell clusters according to some metric(s), such as coupling loss, interference level, etc. between cells. By forming the cell clusters, eNB-to-eNB and UE-to-UE interference between cells in different cell clusters can be controlled. CCIM essentially includes two functionalities, i.e. forming cell clusters and coordinating the transmission within each cell cluster. To properly form the cell clusters, eNB measurements need to be possible, where the purpose of the eNB measurements is to estimate the interference level from/to another eNB.

The cell clusters may be organized hierarchically as a robust tree structure, in which there are root cells with branches, where the maximum branching level being n=2, for example. A robust tree structure may facilitate a reduction of created clusters and coordination among the clusters especially in an area with dense small cells, as compared to other organization such as the weak line structure. A Cluster Head (CH) is an eNBs that is elected for each cluster tasked with the responsibility of managing or maintaining the cluster. Preferably, the Cluster Head may maintain the cluster with minimal required signal transmission and minimal latency when disseminating the variable TDD configuration information to the other eNBs or Cluster Members (CMs) in the cluster.

Figure 2:
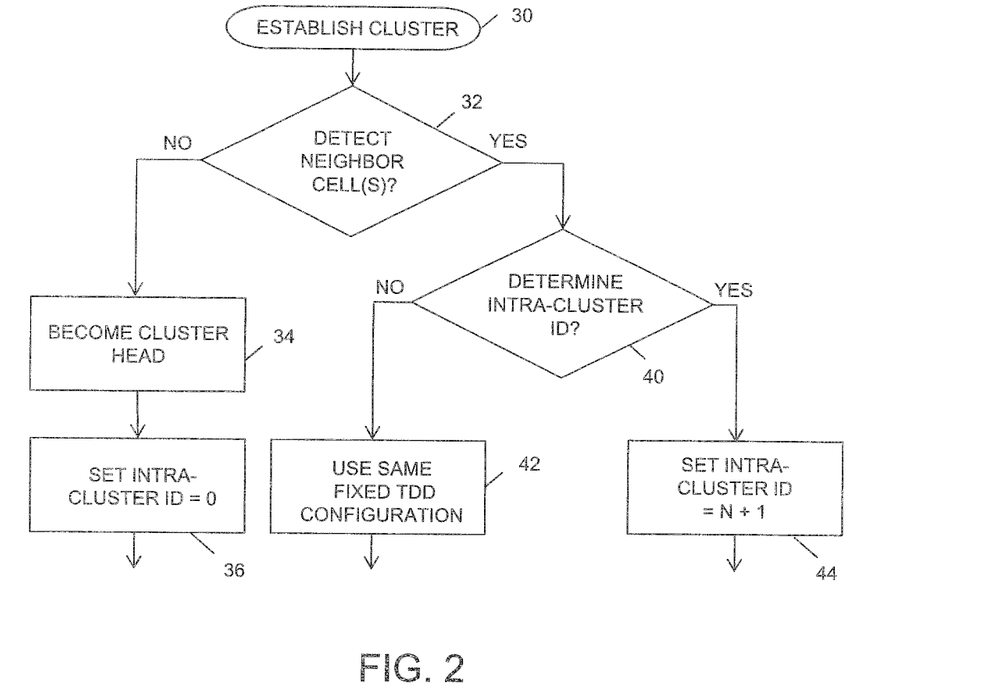
FIG. 2 is a flowchart of an exemplary embodiment of a cluster establishment process 30 according to the teachings of the present disclosure.

FIG. 2 is a flowchart of an exemplary embodiment of a cluster establishment process 30 according to the teachings of the present disclosure. One or more Cluster Members in each cluster may carry out the cluster establishment process 30 and first makes a determination whether it can detect neighbour cells in block 32. When an eNB or cell "enters" or joins a cluster initially, it obtains a cluster ID based on detecting a neighboring cell's intra-cluster ID. If it is unable to detect a neighboring cell, it elects itself as the Cluster Head of the cluster with intra-cell ID set to 0, as shown in blocks 34 and 36. The Cluster Head is then tasked with the responsibility of transmitting broadcast beacon or detection signals and/or TDD configuration notification signals to Cluster Members in the cluster. If in block 32, the cell is able to detect a neighboring cell, but cannot determine its intra-cell ID, then the cell realizes that it is a macro cell and the same fixed TDD configuration should be used, as shown in blocks 40 and 42. If on the other hand, the cell is able to determine the intra-cell ID of the neighboring cell, n, then it sets its own intra-cell ID as n+1, as shown in block 44. The eNB then uses the TDD configuration indicated by the Cluster Head directly or reported by other Cluster Members to the Cluster Head. Accordingly, an eNB uses the TDD configuration indicated by a neighboring cell that has a smaller ID than its own ID.

Figure 3:
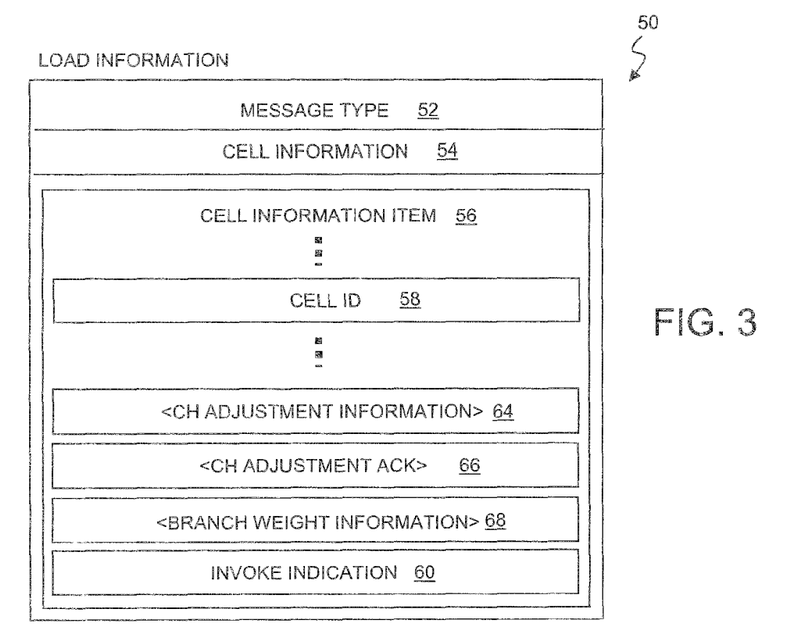
FIG. 3 is a simplified diagram showing an exemplary enhanced LOAD INFORMATION message structure 50.

Referring to FIG. 3, which is a simplified diagram showing an exemplary enhanced LOAD INFORMATION message structure 50 that may be transmitted by an initiating eNB. The LOAD INFORMATION message 50 has been defined by 3*GPP Technical Specification Group Radio Access Network; Evolved Universal Terrestrial Radio*

Access Network (E-UTRAN); X2 Application Protocol (X2AP) Release 11, TS 36.423 (2012-June). The existing LOAD INFORMATION message is intended to be used to initiate the Load Indication procedure for the purpose of transferring load and interference coordination information between eNBs controlling intra-frequency neighbouring cells. The present disclosure provides for the addition of certain new information elements (IEs) or parameters to the existing LOAD INFORMATION message to enable cluster establishment and maintenance. The enhanced LOAD INFORMATION message 50 shown in FIG. 3 includes existing IEs: Message Type 52, Cell Information 54, and Cell Information Item 56. The Cell Information Item 56 further includes existing information elements such as Cell ID 58, and Invoke Indication 60.

For the purposes of cluster establishment and maintenance, an embodiment of the enhanced LOAD INFORMATION message 50 further includes three new information elements: CH Adjustment Information 64, CH Adjustment Acknowledgement (ACK) 66, and Branch Weight Information 68. The CH Adjustment Information IE 64 is preferably used by a Cluster Head to recommend a change to a new Cluster Head identified by the Target Cell ID 60. The CH Adjustment Acknowledgement information IE 64 is preferably used by the new Cluster Head to acknowledge the recommended change and its willingness to assume the Cluster Head role. The Invoke Indication IE 60 provides an indication about which type of information the sending eNB would like the receiving eNB to send back. If the Invoke Indication IE 60 is set to "CH Adjustment," it indicates the sending eNB would like the receiving eNB to initiate the CH adjustment procedure, with the LOAD INFORMATION message containing the CH Adjustment Information IE 64 and other related IEs described herein.

Figure 4:
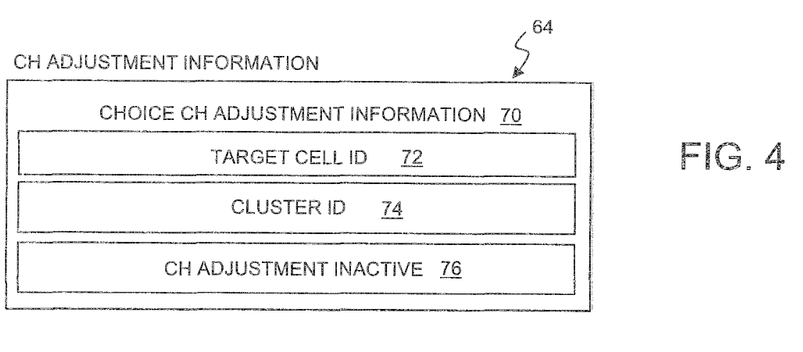
FIG. 4 is a diagram illustrating an exemplary embodiment of the CH Adjustment Information IF 64.

FIG. 4 is a diagram illustrating an exemplary embodiment of the CH Adjustment Information IE 64. This optional IE provides information about which target cell the sending eNB is expecting to "inherit" the Cluster Head role, and will assume the responsibilities of the Cluster Head to maintain the cell cluster. The CH Adjustment Information IE 64 includes the Choice CH Adjustment Information IE 70, that has the following mandatory IEs: Target Cell ID 72, Cluster ID 74, and CH Adjustment Inactive 76. The Target Cell ID IE 72 is used to identify the receiving eNB that is expected to assume the new Cluster Head role. The Cluster ID IE 74 is used to identify the cell cluster in which the Cluster Head adjustment is taking place. The CH Adjustment Inactive IE 76 is used to indicate that the CH adjustment function is not active if it is set to NULL.

Figure 5:
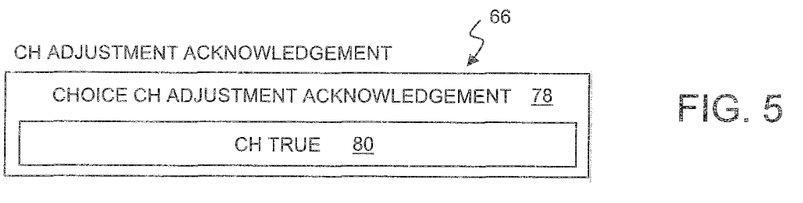
FIG. 5 is a diagram illustrating an exemplary embodiment of the CH Adjustment Acknowledgement IE 66.

FIG. 5 is a diagram illustrating an exemplary embodiment of the CH Adjustment Acknowledgement IE 66. This IE provides information about whether the targeted cell is willing to inherit the Cluster Head role and whether it shall act as the ensuing Cluster Head to maintain the whole cell cluster. The CH Adjustment Acknowledgement IE 66 includes the mandatory Choice CH Adjustment Acknowledgement IE 78, which includes the Choice CH Adjustment Acknowledgement 78 that has the mandatory IE, CH True 80. The CH True IE 80 has a true or false value used to indicate whether the sending eNB is willing to become the new Cluster Head.

Figure 6:
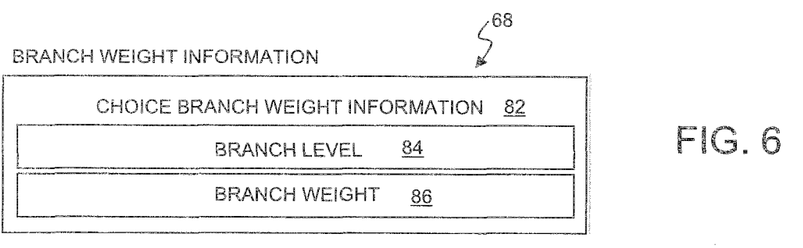
FIG. 6 is a diagram illustrating an exemplary embodiment of the Branch Weight Information IE 68.

FIG. 6 is a diagram illustrating an exemplary embodiment of the Branch Weight Information IE 68. This IE provides information about what is the branch weight in a corresponding branch level. The Branch Weight Information IE 68 includes the mandatory Choice Branch Weight Information 82, which as the following IEs: Branch Level 84 and Branch Weight 86. The Branch Level IE 84 may be optional and may denote at which branch level of a specific cluster the current cell is located, relative to the root cell. The Branch Weight IE 86 may be mandatory and may indicate the branch weight with respect to a corresponding branch level. The Branch Weight information can be in terms of branch levels, which can be predefined by the Cluster Head or the network. An eNB with a larger branch weight is preferred as the Cluster Head. The first level branch level denotes a direct connectivity to the neighboring cell eNBs.

Figure 7:
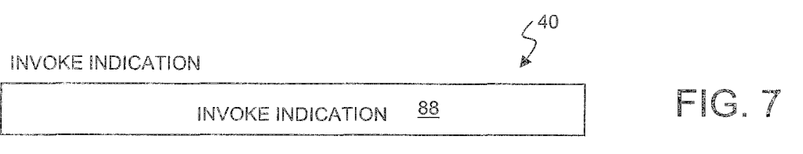
FIG. 7 is a diagram illustrating an exemplary embodiment of the Invoke Indication IE 62.

FIG. 7 is a diagram illustrating an exemplary embodiment of the Invoke Indication IE 62. As indicated above, the Invoke Indication IE 62 is used to enumerate the type of information the sending eNB would like the receiving eNB identified by the Target Cell ID to send back.

As described above, the CH Adjustment procedure is used when an existing Cluster Head nominates another eNB to assume the Cluster Head role, and initiates the transitioning process. Another procedure, CH Election, is used when the existing Cluster Head becomes non-responsive, either fails or sleeps, before such orderly Cluster Head transitioning can take place. The CH Election procedure provides a way to decide on which eNB in the cluster would assume the role of the new Cluster Head.

Figure 8:
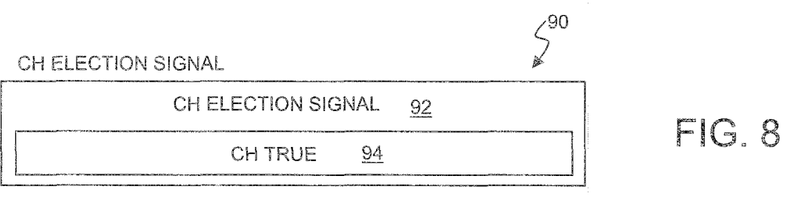
FIG. 8 is a diagram illustrating an exemplary embodiment of a new CH Election Signal IE 90.

FIG. 8 is a diagram illustrating an exemplary embodiment of a new CH Election Signal IE 90. The CH Election Signal IE 90 is intended to be used to initiate the CH Election procedure. The CH Election Signal 90 includes the CH Election IE 92, which has the CH True IE 94. The CH True IE 94 may be used by the sending eNB to indicate that it is willing to serve as the new Cluster Head.

Figure 9:
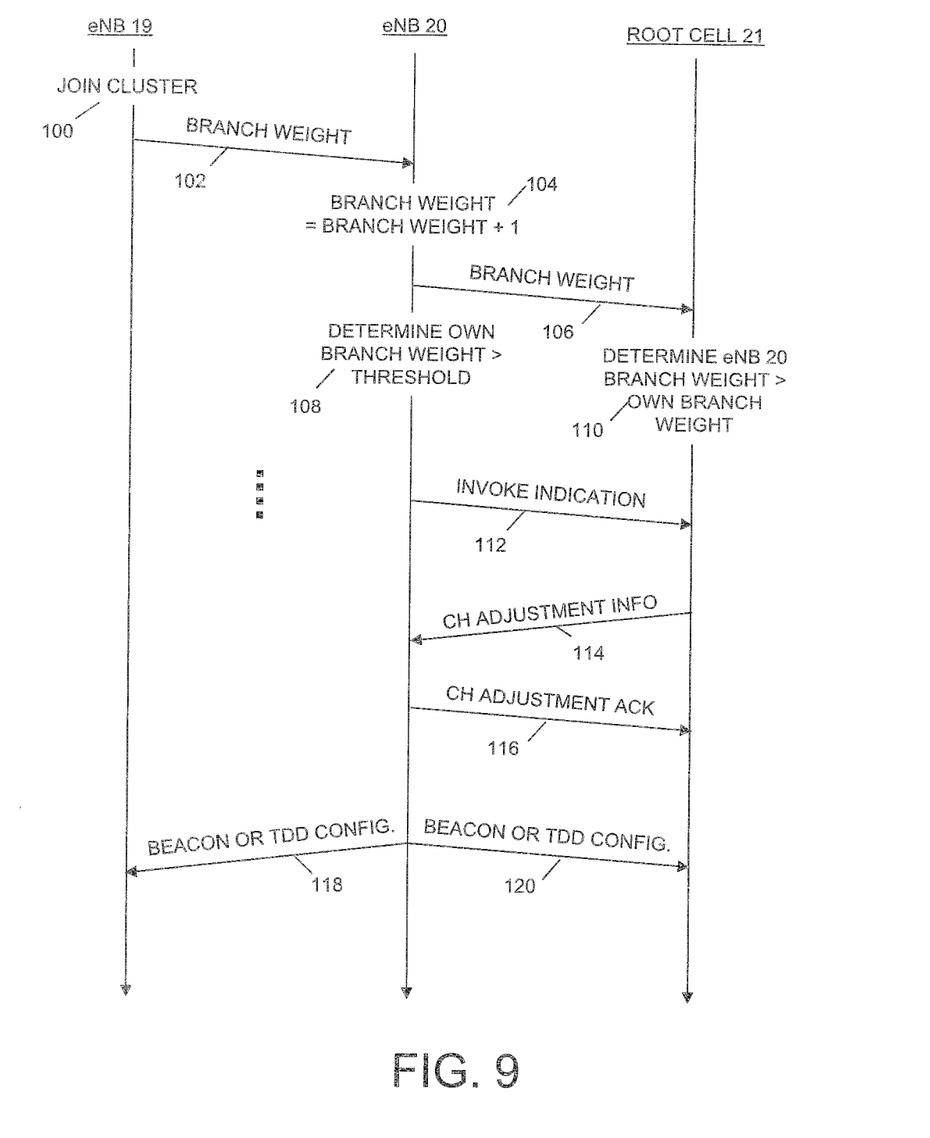
FIG. 9 is a simplified message flow diagram of an exemplary embodiment of the CH Adjustment procedure according to the teachings of the present disclosure.

FIG. 9 is a simplified message flow diagram of an exemplary embodiment of the CH Adjustment procedure according to the teachings of the present disclosure. In general in the first exemplary embodiment, an initiating eNB 19 "enters" or joins a cluster, indicated by reference numeral 100. The eNB 19 detects a neighboring cell, eNB 20, in previous branch level and reports the Branch Weight information as feedback. The eNB 20 receives the Branch Weight 102 from the new eNB and increases its own branch weight based on this feedback from the eNB 19, as indicated by reference numeral 104. The eNB 20 further provides its own updated Branch Weight 106 to its root cell 21, which serves as the current Cluster Head of the cluster. The eNB 20 compares its own branch weight with a predefined threshold, as indicated by reference numeral 108. If its own branch weight exceeds this predefined threshold, it may send an Invoke Indication IE 112 to trigger the CH Adjustment procedure. The root cell 21 may confirm the CH Adjustment procedure by sending the CH Adjustment Information IE 112 after confirming that itself is not the optimal Cluster Head compared to the eNB 20. The CH Adjustment Information IE would identify the eNB 20 in the Target Cell ID IE. In this scenario, the eNB 20 is the next branch cell with the largest branch weight than all the next level branch cells.

Alternately, the CH Adjustment procedure may be initiated after the root cell 21 compares its own branch weight to the branch weight of the eNB 20, as indicated by reference numeral 110. If the branch weight of the root cell is less than that of the branch cells in the first level with a predefined offset value, it may also trigger the CH Adjustment procedure toward the branch cell with the largest branch weight. The predefined offset value may be a network optimizing parameter or it may be configured by the network.

Having recognized that it is no longer the optimal node to serve as the Cluster Head, the root cell 21 sends a message containing the CH Adjustment Information IE 114 to the eNB 20. The eNB 20 responds by sending back the CH Adjustment Acknowledgement IE 116 confirming that it will assume the role of Cluster Head. Subsequently, the eNB assumes the Cluster Head role and transmits the beacon/detection signal or the TDD configuration notification information to the Cluster Members in its cluster.

Figure 10:
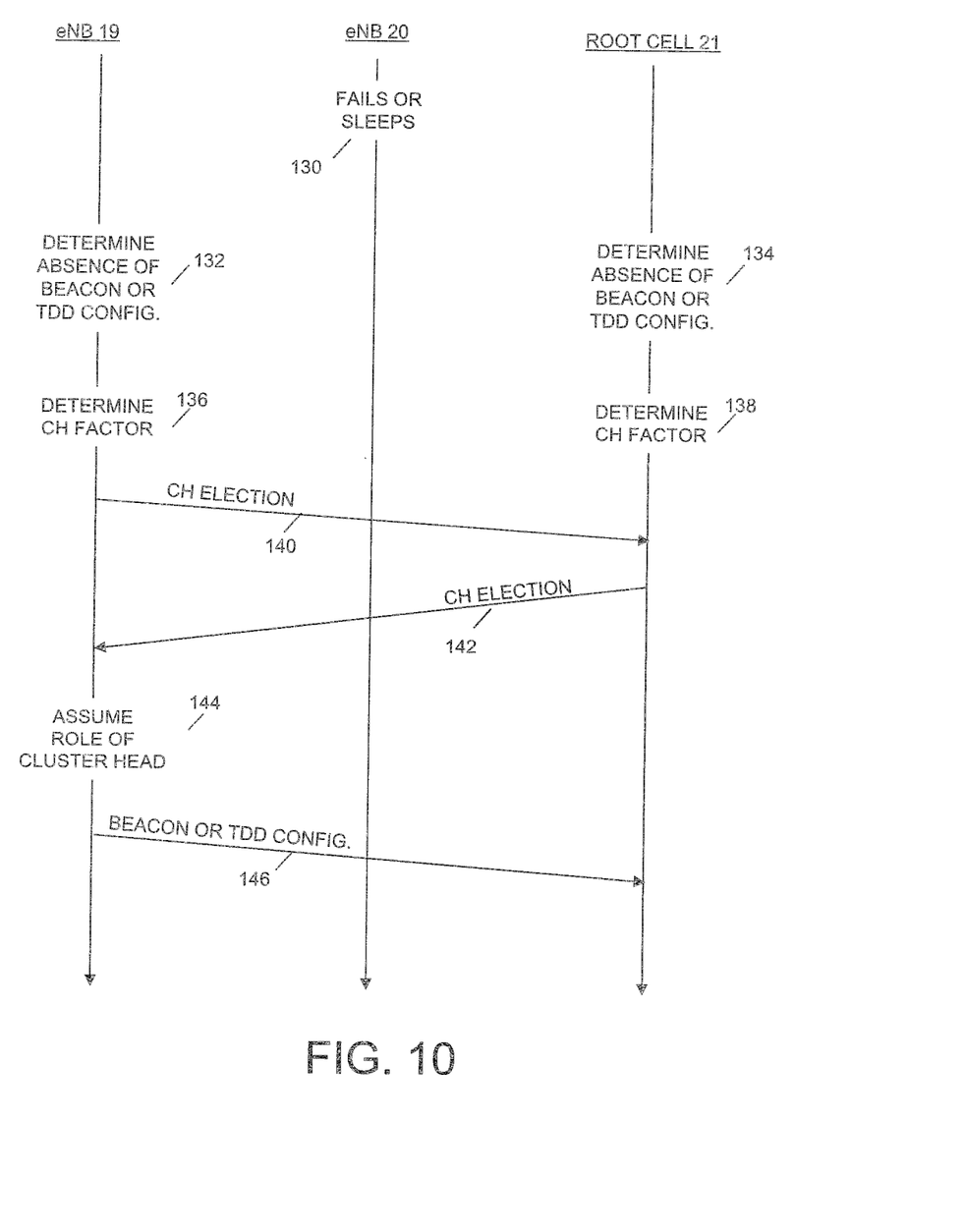
FIG. 10 is a simplified message flow diagram illustrating an exemplary embodiment of the CH Election procedure.

FIG. 10 is a simplified message flow diagram illustrating an exemplary embodiment of the CH Election procedure in which a new Cluster Head is elected by a random competition based on some predetermined rules. The predetermined rule may use an integrated factor based on both the branch weight and the distance or coupling loss relative to the failed or sleeping Cluster Head. The CH Election procedure is used when the prior Cluster Head either fails or goes to sleep without first sending an CH Adjustment Information signal to nominate the next Cluster Head. Referring to FIG. 10, the Cluster Head eNB 20 fails or goes to sleep, as indicated by reference numeral 130, without nominating another cell to assume its role. The Cluster Members, eNB 19 and root cell 21 become aware that there is an absence of the broadcast beacon/detection signal or TDD configuration notification signal, as indicated by reference numerals 132 and 134. The branch eNB with a higher factor, determined based on the larger weight and/or less distance or smaller coupling loss to the previous Cluster Head (136, 138), is set to send the CH Election signal earlier in a time window defined by the network or the previous Cluster Head. The transmission power may be extended slightly based on the estimation of relative distance or coupling loss to reduce the impact of the Cluster head transition. In the example shown in FIG. 10, eNB 19 has a larger weight and/or less distance or smaller coupling loss to the previous Cluster Head, so it sends the CH Election signal earlier than the root cell 21, as indicated by reference numerals 140 and 142. The CH Election signal may include a Boolean IE that indicates whether it is willing to serve as the next Cluster Head. A collision between the cells may occur during contention. Various collision resolution techniques may be employed to resolve the collision. Accordingly, the eNB 19 assumes the role of Cluster Head, as indicated by reference numeral 144, and begins to send the beacon or detection signal or TDD configuration notification information 146 to its Cluster Members.

The present disclosure provides novel procedures and signals used to establish and maintain a cell cluster that have been previously unavailable. Examples have been illustrated in the message format and message flow diagrams but variations and modifications are contemplated to adapt to different operating conditions, for example.

The features of the present invention which are believed to be novel are set forth below with particularity in the appended claims. However, modifications, variations, and changes to the exemplary embodiments described above will be apparent to those skilled in the art, and the system and method described herein thus encompass such modifications, variations, and changes and are not limited to the specific embodiments described herein.

GLOSSARY

3GPP Third Generation Partnership Project
CCIM Cell Clustering Interference Mitigation
CDMA Code Division Multiple Access
CH Cluster Head
CM Cluster Member
CS Circuit Switched
DL Downlink
eICIC Enhanced Inter-Cell Interference Coordination
eNB Enhanced Node B
eNodeB Enhanced Node B
EPC Evolved Packet Core
E-UTRAN Evolved Universal Terrestrial Radio Access Network
FDMA Frequency Division Multiple Access
GSM Global System for Mobile Communications
HetNet Heterogeneous Network
HSPA High Speed Packet Access
IM Interference Mitigation
LTE Long Term Evolution
TDD Time Division Duplex
TDMA Time Division Multiple Access
UE User Equipment
UL Uplink
UMTS Universal Mobile Telecommunication System
UTRAN UMTS Terrestrial Radio Access Network
WCDMA Wideband Code Division Multiple Access

What is claimed is:

1. A wireless communication method of establishing and maintaining a cell cluster comprising at least one cell configured to communicate with at least one UE (User Equipment), comprising:
   detecting a broadcast beacon signal;
   in response of an absence of the broadcast beacon signal, assuming the role of a cluster head of a cluster having a specific intra-cell identifier, and broadcasting a beacon signal;
   in response to detecting the broadcast beacon signal and an absence of an intra-cell identifier, continuing to transmit and receive using a prior duplex communication configuration; and
   in response to detecting the broadcast beacon signal and a presence of the intra-cell identifier, joining the cell identified by the detected intra-cell identifier, and setting its intra-cell identifier based on the detected intra-cell identifier.

2. The method of claim 1, wherein continuing to transmit and receive using a prior duplex communication configuration comprises communicating using an existing Time Division Duplex (TDD) configuration for uplink and downlink transmissions.

3. The method as set forth in claim 1, further comprising:
   determining that a second cell should assume the role of a cluster head based on a set of predetermined rules;
   transmitting a Cluster Head (CH) Adjustment Information Signal to the second cell to initiate a transition to the second cell as the new cluster head;
   receiving a CH Adjustment ACK Signal from the second cell indicating assumption of the new cluster head role; and
   receiving a broadcast beacon signal from the new cluster head.

4. The method as set forth in claim 1, wherein determining that a second cell should assume the cluster head role further comprises making the determination based on a comparison between the current cluster head and the second cell.

5. The method as set forth in claim 1, wherein determining that a second cell should assume the cluster head role further comprises making the determination based on a comparison of a branch weight between the current cluster head and the second cell.

6. The method as set forth in claim 1, wherein determining that a second cell should assume the cluster head role further comprises making the determination based on a comparison of a branch weight of the current cluster head being less than a predetermined threshold.

7. The method as set forth in claim 1, further comprising:
   determining that a cell should assume the role of a cluster head based on its branch weight exceeding a predetermined threshold;
   transmitting an Invoke Indication signal to a root cell to initiate a CH Adjustment process;
   receiving a CH Adjustment Information signal from the root cell;
   transmitting a CH Adjustment ACK signal to the root cell; and
   beginning periodic broadcast of at least one of a beacon signal and a TDD configuration notification.

8. The method as set forth in claim 1, further comprising:
   detecting an absence of the beacon signal transmitted by a current cluster head for a predetermined time period;
   transmitting a CH Election signal in response to the absence of the beacon signal indicating an intention to compete to assume the role of cluster head;
   assuming the role of the cluster head and beginning periodic broadcast of at least one of a beacon signal and a Time Division Duplex (TDD) configuration notification.

9. The method as set forth in claim 8, further comprising resolving collision among cluster members in the cluster.

10. A wireless communication network node, comprising:
    an antenna;
    at least one radio transmitter and receiver;
    at least one processor providing resource management and logical control functions, configured to:
    detect a broadcast beacon signal;
    in response of an absence of the broadcast beacon signal, assume the role of a cluster head of a cluster having a specific intra-cell identifier, and broadcast a beacon signal;
    in response to detecting the broadcast beacon signal and an absence of an intra-cell identifier, continue to transmit and receive using a prior duplex communication configuration; and
    in response to detecting the broadcast beacon signal and a presence of the intra-cell identifier, join the cell identified by the detected intra-cell identifier, and set its intra-cell identifier based on the detected intra-cell identifier.

11. The wireless communication network node of claim 10, wherein the at least one processor is configured to transmit and receive using a prior duplex communication configuration comprises communicating using an existing Time Division Duplex (TDD) configuration for uplink and downlink transmissions.

12. The wireless communication network node of claim 10, wherein the at least one processor is configured to further:
    determine that a second cell should assume the role of a cluster head based on a set of predetermined rules;
    transmit a Cluster Head (CH) Adjustment Information Signal to the second cell to initiate a transition to the second cell as the new cluster head;
    receive a CH Adjustment ACK Signal from the second cell indicating assumption of the new cluster head role; and
    receive a broadcast beacon signal from the new cluster head.

13. The wireless communication network node of claim 10, wherein the at least processor is configured to make a determination based on a comparison between the current cluster head and the second cell.

14. The wireless communication network node of claim 10, wherein the at least processor is configured to make the determination based on a comparison of a branch weight between the current cluster head and the second cell.

15. The wireless communication network node of claim 10, wherein the at least processor is configured to make the determination based on a comparison of a branch weight of the current cluster head being less than a predetermined threshold.

16. The wireless communication network node of claim 10, wherein the at least processor is further configured to:
    determine that a cell should assume the role of a cluster head based on its branch weight exceeding a predetermined threshold;
    transmit an Invoke Indication signal to a root cell to initiate a CH Adjustment process;
    receive a CH Adjustment Information signal from the root cell;
    transmit a CH Adjustment ACK signal to the root cell; and
    begin periodic broadcast of at least one of a beacon signal and a Time Division Duplex (TDD) configuration notification.

17. The wireless communication network node of claim 10, wherein the at least processor is configured to:
    detect an absence of the beacon signal transmitted by a current cluster head for a predetermined time period;
    transmit a Cluster Head (CH) Election signal in response to the absence of the beacon signal indicating an intention to compete to assume the role of cluster head;
    assume the role of the cluster head and beginning periodic broadcast of at least one of a beacon signal and a Time Division Duplex (TDD) configuration notification.

18. The wireless communication network node of claim 17, wherein the at least processor is configured to resolve collision among cluster members in the cluster.

19. A non-transitory computer-readable medium comprising a set of instructions, which, when executed on a communication network node causes it to perform the steps of:
    detecting a broadcast beacon signal;
    in response of an absence of the broadcast beacon signal, assuming the role of a cluster head of a cluster having a specific intra-cell identifier, and broadcasting a beacon signal;
    in response to detecting the broadcast beacon signal and an absence of an intra-cell identifier, continuing to transmit and receive using a prior duplex communication configuration; and
    in response to detecting the broadcast beacon signal and a presence of the intra-cell identifier, joining the cell identified by the detected intra-cell identifier, and setting its intra-cell identifier based on the detected intra-cell identifier.

20. The non-transitory computer-readable medium of claim 19, further comprising a set of instructions, which, when executed on a communication network node causes it to perform the step of communicating using an existing Time Division Duplex (TDD) configuration for uplink and downlink transmissions.

* * * * *